(No Model.)

W. B. DUNNING.
CATTLE GUARD.

No. 470,556. Patented Mar. 8, 1892.

Witnesses:
C. B. Bull.
James F. Duhamel.

Inventor,
W. B. Dunning,
by Dodge & Sons.
Attys

UNITED STATES PATENT OFFICE.

WILLIAM B. DUNNING, OF GENEVA, NEW YORK.

CATTLE-GUARD.

SPECIFICATION forming part of Letters Patent No. 470,556, dated March 8, 1892.

Application filed December 26, 1891. Serial No. 416,112. (No model.)

*To all whom it may concern:*

Be it known that I, WILLIAM B. DUNNING, a citizen of the United States, residing at Geneva, in the county of Ontario and State of New York, have invented certain new and useful Improvements in Cattle-Guards, of which the following is a specification.

My present invention relates to cattle-guards for railways; and the invention consists in a construction of the same, as hereinafter more fully described.

Figure 1:
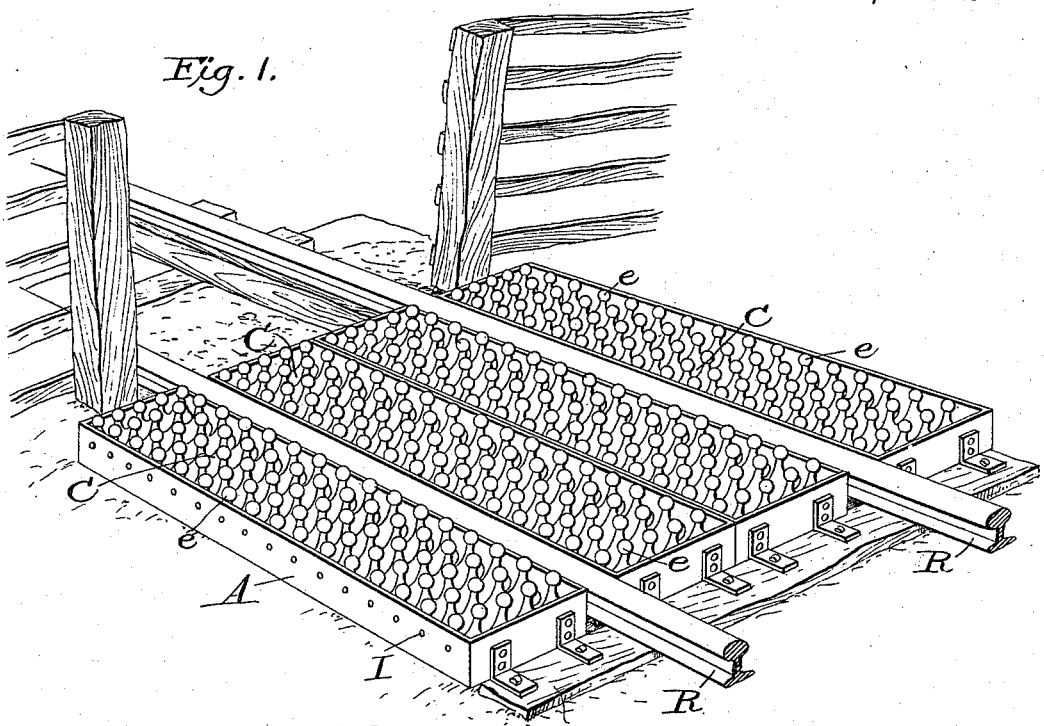
Figure 2:
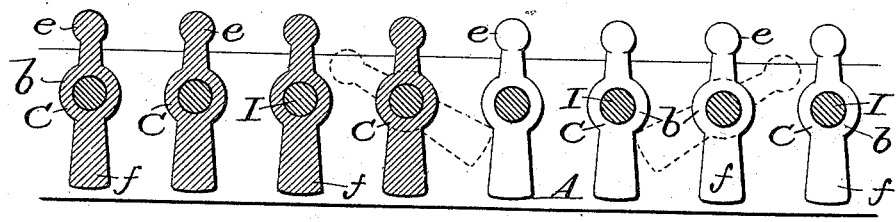
Figure 3:
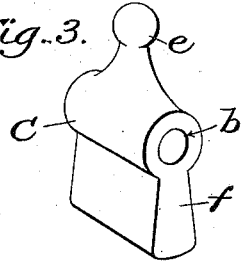

Figure 1 is a perspective view of the guard applied to a railroad-track. Fig. 2 is a longitudinal section, shown enlarged to show the construction; and Fig. 3 is a perspective view of one of the pendants detached.

The object of this invention is to produce a cattle-guard for railways that will be durable, simple, and efficient, and that will enable the guards to be made up readily of any size and shape required to suit the various conditions under which cattle-guards are or may be required at different points along a railway. It is well known that cattle and nearly all animals when traveling will stop and draw back whenever one of their feet strikes upon a yielding support, and more especially so if the support be composed of a series of small points upon which the foot cannot rest squarely and securely, and I therefore construct my cattle-guard in such a manner that it shall possess these two qualities and at the same time be strong, durable, and simple in construction. To accomplish these objects I make a series of cast-iron pendants C of the general form shown in Fig. 3. It is simply a cast-iron block having a central hub or body with a hole $b$ through it, as shown, with a small rounded or pointed projection $e$ at its upper end and a depending wing $f$ below, the part $f$ being heavier than the upper part, so that when mounted loosely on a rod it will always assume an upright position, as shown in Figs. 1 and 2. Having made a sufficient number of these pendants C, I then mount them loosely on iron rods I, as shown in Fig. 2, these rods, with the pendants strung loosely thereon, being secured in a suitable frame A, preferably made of wrought-iron bars set edgewise, as represented in Figs. 1 and 2, though it is obvious that the frame or support for the rods may be made of wood, and that whether of wood or iron the end pieces of the frame may be dispensed with, the side pieces, if securely fastened in place, being sufficient to support the rods and their rows of pendants, it only being necessary that the rods, with their pendants, shall be securely held in position and thus form a roadway or surface on which the animals must step in attempting to pass.

Care must be taken to so place these guards as to elevate them above the surface of the ground, so that the pendants C shall hang suspended and free to swing or turn on their rods whenever an animal places its foot on them. When the guard is to be used at a culvert or open ditch, there will of course be a free space underneath, and it is only when used at a point on the track where these do not exist, as represented in Fig. 1, that any special care on this point will be required. Even at such points if the frame be secured upon the top of the ties T, as there shown, or in any similar manner there will usually be sufficient space below to permit the pendants to swing freely. In case there should not be it will only be necessary to remove a little of the earth underneath, or, better still, raise the guard by fastening blocks on top of the ties and securing the guard upon such blocks.

The blocks or pendants C may vary in form somewhat and will be from six to twelve inches long from top to bottom, eight inches being considered a good size.

By having a supply of them on hand guards of any required length or width can be made up at any time when required and to suit any and all locations, whether between the tracks or at the sides of the track, or both, as represented in Fig. 1.

Whenever an animal attempts to cross this guard and places its foot thereon for that purpose, the pendants C will immediately turn on their rods, as indicated by the dotted lines in Fig. 2, and as they yield under the pressure of the foot the animal will at once draw back and give up the attempt to cross. When the foot is placed upon the pendants, some will tip in one direction and some in the opposite direction, according to the inclination of the surface of that part of the foot that is brought to bear upon the different points. The upper ends or points *e* may be made larger or smaller and more pointed, if desired; but I prefer to make them in the form of a knob, or rounded, as shown, first, because they will be less liable to injure the animal's foot than if made with sharp points, and, second, because by being rounded they will more readily turn or slip under the pressure of the foot. Moreover, an animal will hesitate to step upon a surface composed of series of points like these, whether rounded or sharp.

It is obvious that instead of the metal frame A a couple of wooden bars may be secured parallel with the rails R to support the rods and their pendants; but I prefer the metallic frame, because it is more durable and also because additional bars can be inserted at intervals between the side bars to support the rods and prevent the rods from being bent. By using intermediate bars lighter rods can be used.

I am aware that spiked rollers and also rollers having projecting wings have been used to form cattle-guards, and also that pivoted levers or arms have been used in connection with levers for the animals to tread upon, so arranged that when the animal trod upon the latter the former would be thrown up in front, and I do not claim any of these; but What I do claim is—

1. A cattle-guard composed of a series of weighted pendants C, mounted loosely on rods and arranged to form a yielding surface, substantially as shown and described.

2. In a cattle-guard, the combination, with suitable supports, of two or more rods, each rod having mounted thereon a series of pendants C, each of said pendants being free to tip or turn independently and all being weighted, as described, whereby they are caused to assume a vertical position normally, substantially as shown and described.

3. A cattle-guard having its upper face composed of a series of small points or projections, each point or projection being pivoted and thus arranged to tip or yield independently of the others when trod upon, substantially as described.

In witness whereof I hereunto set my hand in the presence of two witnesses.

WILLIAM B. DUNNING.

Witnesses:
CHAS. H. WILLIAMS,
CHARLES E. WILLIAMS.